US010594745B2

(12) United States Patent
Ritchie et al.

(10) Patent No.: US 10,594,745 B2
(45) Date of Patent: Mar. 17, 2020

(54) PROCESSING SIGNALLING

(71) Applicant: Metaswitch Networks Ltd., Enfield (GB)

(72) Inventors: Benjamin Ritchie, Enfield (GB); Benedict Russell, Enfield (GB); David Court, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/250,968

(22) Filed: Jan. 17, 2019

(65) Prior Publication Data
US 2019/0230135 A1 Jul. 25, 2019

(30) Foreign Application Priority Data

Jan. 22, 2018 (GB) .................................. 1801016.5
Sep. 20, 2018 (GB) .................................. 1815300.7

(51) Int. Cl.
*H04L 29/06* (2006.01)
*H04M 3/42* (2006.01)

(52) U.S. Cl.
CPC ...... *H04L 65/1069* (2013.01); *H04L 65/1006* (2013.01); *H04L 65/1016* (2013.01); *H04L 65/1046* (2013.01); *H04L 65/1073* (2013.01); *H04L 65/1096* (2013.01);
(Continued)

(58) Field of Classification Search
None
See application file for complete search history.

(56) References Cited

U.S. PATENT DOCUMENTS

| 7,804,818 | B1 | 9/2010 | Atluri et al. |
| 2008/0311888 | A1 | 12/2008 | Ku et al. |
| 2009/0164556 | A1 | 6/2009 | Siegel et al. |

(Continued)

FOREIGN PATENT DOCUMENTS

| EP | 1705930 A2 | 9/2006 |
| EP | 2475151 A1 | 7/2012 |
| WO | 2009086939 A1 | 7/2009 |

OTHER PUBLICATIONS

Combined Search and Exam Report dated Apr. 11, 2018 for Application No. GB1801016.5.

(Continued)

*Primary Examiner* — Peter Chen
(74) *Attorney, Agent, or Firm* — EIP US LLP

(57) ABSTRACT

Processing signalling relating to a telephony session. A first telephony session establishment request relating to the telephony session is received. The first telephony session establishment request comprises a first telephony identifier as a calling party identifier. The first telephony identifier is replaced with a second telephony identifier. The second telephony identifier is different from the first telephony identifier. Call processing relating to the telephony session is enabled to be performed based on the second telephony identifier. The second telephony identifier is replaced with a telephony identifier other than the second telephony identifier. A second telephony session establishment request relating to the telephony session is transmitted. The second telephony session establishment request comprises the other telephony identifier.

17 Claims, 11 Drawing Sheets

(52) U.S. Cl.
    CPC ... *H04M 3/42042* (2013.01); *H04M 3/42059* (2013.01); *H04M 3/42238* (2013.01)

(56) References Cited

U.S. PATENT DOCUMENTS

| | | |
|---|---|---|
| 2009/0168985 A1* | 7/2009 | Yu ..................... H04L 12/1822 379/202.01 |
| 2011/0026468 A1 | 2/2011 | Conrad et al. |
| 2012/0177029 A1* | 7/2012 | Hillier .................. H04L 61/106 370/352 |
| 2012/0250842 A1 | 10/2012 | Low et al. |
| 2013/0227058 A1 | 8/2013 | Drysdale et al. |
| 2013/0295892 A1 | 11/2013 | Backhaus et al. |
| 2015/0079998 A1 | 3/2015 | Lowman et al. |

OTHER PUBLICATIONS

UK Search Report dated Nov. 12, 2018 for Application No. GB1815300.7.
European Search report dated May 20, 2019 for Application No. EP 19152379.4.
United States Pre-Interview First Office Action dated Jul. 19, 2019 for U.S. Appl. No. 16/250,967.

* cited by examiner

PROCESSING SIGNALLING

CROSS-REFERENCE TO RELATED APPLICATIONS

This application claims the benefit under 35 U.S.C. § 119(a) and 37 CFR § 1.55 to UK patent application no. 1801016.5, filed on Jan. 22, 2018, and UK patent application no. 1815300.7 filed on Sep. 20, 2018, the entire content of both of which is incorporated herein by reference.

BACKGROUND OF THE INVENTION

Field of the Invention

The present disclosure relates to processing signalling.

Description of the Related Technology

A decomposed telephone network splits up the network into separate network entities (also known as "network elements" or "network nodes") that are responsible for performing different tasks in the network. Examples of such tasks include, but are not limited to, call services and billing. An example of such a decomposed network is an IP Multimedia Subsystem (IMS) network. Some such network entities are, in practice, difficult to modify. For example, such modification may be complex, and/or such network entities may be heavily integrated into a service provider network. It would be desirable to be able to provide additional call processing services, with these considerations in mind.

SUMMARY

According to a first aspect, there is provided a method of processing signalling relating to a telephony session, the method comprising: receiving a first telephony session establishment request relating to the telephony session, the first telephony session establishment request comprising a first telephony identifier as a calling party identifier; replacing the first telephony identifier with a second telephony identifier, the second telephony identifier being different from the first telephony identifier; enabling call processing relating to the telephony session to be performed based on the second telephony identifier; replacing the second telephony identifier with a telephony identifier other than the second telephony identifier; and transmitting a second telephony session establishment request relating to the telephony session, the second telephony session establishment request comprising the other telephony identifier.

According to a second aspect, there is provided network entity configured to perform a method provided according to the first aspect.

According to a third aspect, there is provided a computer program arranged, when executed, to perform a method according to the first aspect.

Further features and advantages will become apparent from the following description, given by way of example only, which is made with reference to the accompanying drawings.

DETAILED DESCRIPTION OF CERTAIN INVENTIVE EMBODIMENTS

Figure 1:
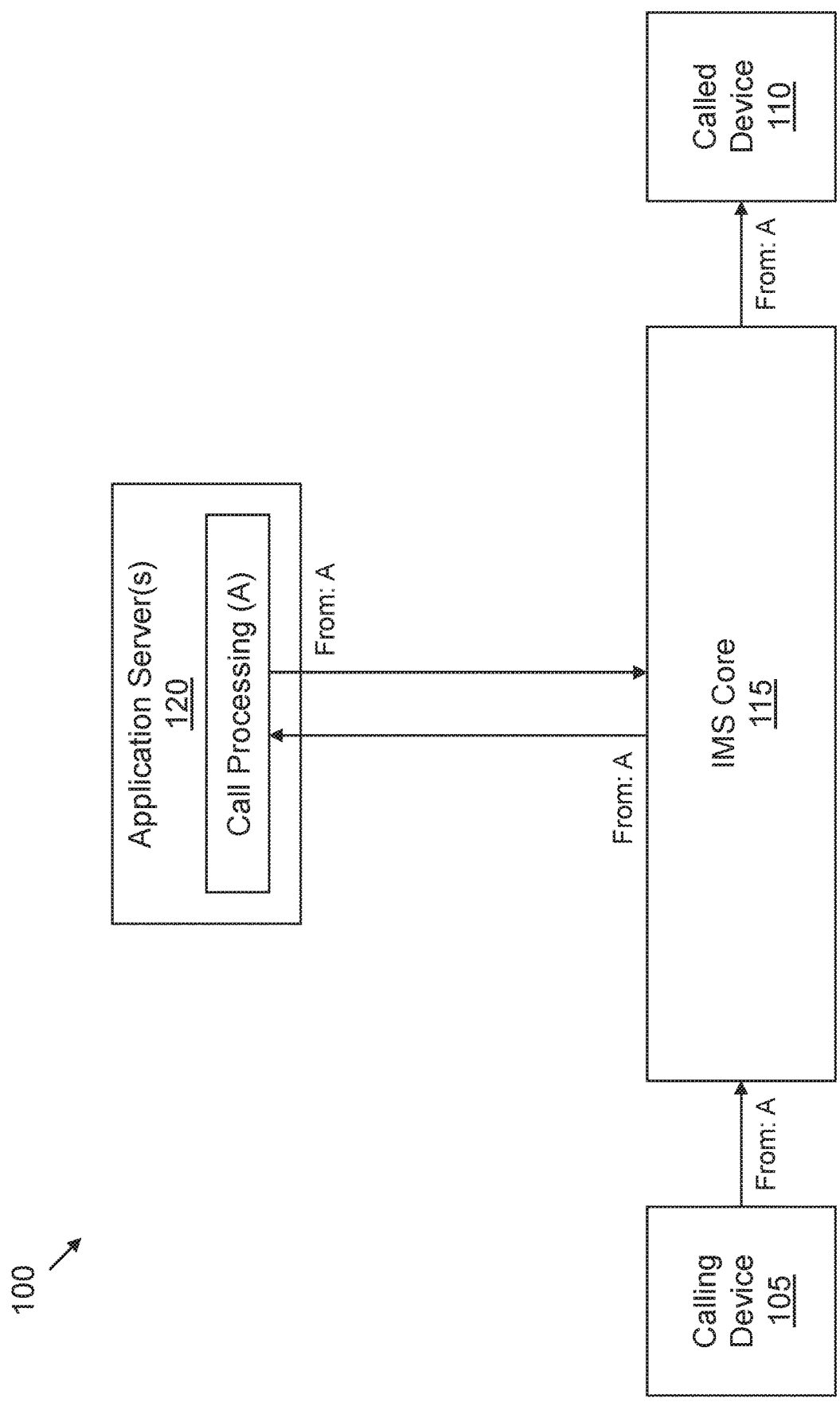
FIG. 1 shows a schematic block diagram of an example of a network.

Referring to FIG. 1, there is shown schematically an example of a network 100. In this example, the network 100 comprises a telecommunications network. A telecommunications network enables telecommunication between at least two call parties. In this example, the network 100 comprises a telephony network (also known as a "telephone network"). A telephony network enables telephone calls to be conducted between at least two call parties.

The network 100 comprises various network entities. The network entities may be implemented in hardware and/or software. A given network entity may be implemented in a dedicated hardware device or may be virtualised. The network entities may comprise, or may otherwise be associated with, one or more processors and one or more memories. The one or more memories may comprise one or more computer programs comprising computer-readable instructions. The one or more processors may execute the computer-readable instructions and perform at least some of the techniques described herein as a result.

The network 100 comprises a plurality of devices 105, 110. In this example, the plurality of devices 105, 110 comprises calling and called devices 105, 110. The calling and called devices 105, 110 may also be referred to as "originating" and "terminating" devices respectively. The calling and called devices 105, 110 are associated with calling and called parties respectively. A calling party may also be referred to as a "from party", a "caller" etc. A called party may also be referred to as a "to party", a "callee" etc. In this example, the calling and called devices 105, 110 are user devices. A user device may be referred to as an "endpoint", an "end user device", a "terminal" etc. Examples of user devices include, but are not limited to, mobile telephones (also known as "cell phones"), tablet computing devices (also known as "tablets") and desk phones.

Examples described herein involve the use of various telephony identifiers (also known as "telephony identities"). A telephony identifier may be associated with one or more network entities. A telephony identifier may be associated with one or more users. Examples of telephony identifiers include, but are not limited, to mobile telephone numbers, landline telephone numbers and Session Initiation Protocol (SIP) Uniform Resource Identifiers (URIs). An example of a mobile telephone number is a Mobile Station International Subscriber Directory Number (MSISDN). A landline telephone number may be defined in accordance with the E.164 numbering plan. A landline telephone number may be referred to as a "fixed-line" telephone number. A telephony identifier associated with a calling party identifier may be referred to as a "calling party identifier", a "calling party identity" etc. A telephony identifier associated with a called party identifier may be referred to as a "called party identifier", a "called party identity" etc.

There are various different types of telephony identifier. The type of a given telephony identifier may correspond to a type of telephony network and/or telephony service with which the given telephony identifier is associated. For example, a landline telephone number (an example of a telephony identifier associated with a landline telephony service) and a mobile telephone number (an example of a telephony identifier associated with a mobile telephony service) are different types of telephony identifier.

This specific example involves the use of a first telephony identifier, A. In this example, the first telephony identifier A is associated with the calling device 105. The first telephony identifier, A, may comprise a mobile telephone number, for example where the calling device 105 comprises a mobile telephone. The mobile telephone number may be associated with a Subscriber Identity Module (SIM) card of the calling device 105. Such a mobile telephone number may be referred to as a "SIM identity".

The network 100 comprises an IMS core 115. The IMS core 115 comprises various network entities. Examples of such network entities include, but are not limited to, Proxy Call Session Control Functions (P-CSCFs), Interrogating Call Session Control Functions (I-CSCFs) and Serving Call Session Control Functions (S-CSCFs).

The network 100 comprises one or more application servers (ASs) 120. The one or more ASs 120 may comprise one or more telephony application servers (TASs). A TAS is an entity in a telephony network that performs one or more functions in the telephony network not directly related to routing signalling through the telephony network. In some examples, the one or more ASs are installed as one or more new elements in the network 100. In other examples, one or more existing ASs are modified to have the functionality described herein.

The IMS core 115 and the one or more ASs 120 may communicate with each other via an IMS Service Control (ISC) interface.

Examples described herein relate to processing signalling relating to a telephony session. A telephony session may be referred to as a "telephone call", a "phone call", a "call", etc. Such processing may involve processing one or more messages relating to the telephony session. Processing signalling relating to a telephony session may involve invoking one or more instances of the one or more ASs 120. For example, a first instance of a given AS 120 may be invoked at a first point in time and a second instance of the same given AS 120 may be invoked at a second, subsequent point in time. The first instance of the given AS 120 may be invoked to apply originating call services in relation to the signalling and the second instance of the given AS 120 may be invoked to apply terminating call services in relation to the signalling. In such an example, the same AS 120 can provide originating and terminating call services and may be considered to be an originating and terminating AS 120. In other examples, an instance of a first AS 120 of a plurality of ASs 120 may be invoked at a first point in time and an instance of a second, different AS 120 of the plurality of ASs may be invoked at a second, subsequent point in time. The instance of the first AS 120 may be invoked to apply originating call services in relation to the signalling and the instance of the second AS 120 may be invoked to apply terminating call services in relation to the signalling. In such an example, different ASs 120 can provide originating and terminating call services, with the first AS 120 being an originating AS 120 and the second AS 120 being a terminating AS 120.

For convenience and brevity, in this specific example, the one or more ASs 120 consist of a single AS 120, it being understood that the one or more ASs 120 may comprise multiple ASs 120 in other examples. As such, in this specific example, the AS 120 can be invoked once, or can be invoked multiple times. Each invocation of the AS 120 corresponds to an instance of the AS 120 having been invoked.

In this example, the IMS core 115 is configured with control logic data indicating that the AS 120 is to be invoked for telephony sessions from the calling device 105. Signalling relating to such telephony sessions may comprise the first telephony identifier, A, as a calling party identifier. The control logic data may therefore be associated with the first telephony identifier, A. Control logic data may also be referred to as "filter" data. The control logic data may comprise Initial Filter Criteria (iFC) data, for example. The control logic data may indicate which ASs are to be invoked in certain scenarios, and an order in which the ASs are to be invoked.

The IMS core 115 and the AS 120 may be part of a service provider network. The service provider network is associated with a service provider. For example, the service provider network may be under the control of the service provider. In some examples, the service provider provides service to one or both of the calling party and the called party. In some examples, the service provider does not provide service to one or both of the calling party and the called party.

Figure 2:
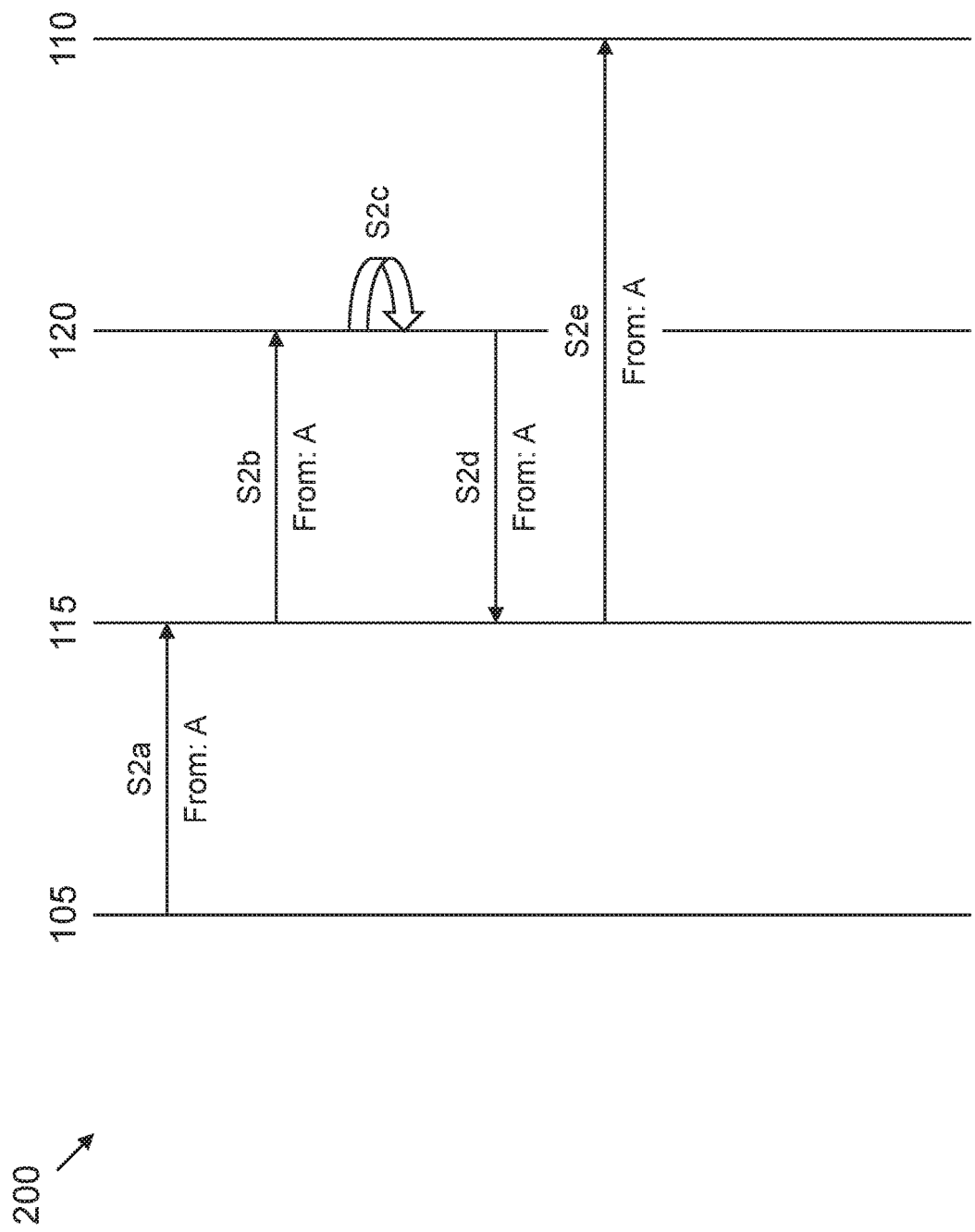
FIG. 2 shows a sequence diagram representing an example of a method, the method being performed in the example network shown in FIG. 1.

Referring to FIG. 2, there is shown schematically an example of a method 200 performed in the example network 100 shown schematically in FIG. 1. The method 200 is an example of a method of processing signalling relating to a telephony session. In this example, the method is performed by the AS 120. In this example, various telephony session establishment requests are communicated. In this specific example, the telephony session establishment requests are in the form of SIP INVITEs.

At item S2a, the calling device 105 transmits a telephony session establishment request to the IMS core 115. The telephony session establishment request of item S2a may be transmitted in response to user input at the calling device 105. The telephony session establishment request of item S2a comprises the first telephony identifier, A, as a calling party identifier.

At item S2b, the IMS core 115 transmits a telephony session establishment request to the AS 120. This may be based on control logic data associated with the first telephony identifier, A. For example, iFC data associated with the first telephony identifier, A, may indicate that the AS 120 is to be invoked for telephony sessions originating from the calling device 105. The telephony session establishment request of item S2b comprises the first telephony identifier, A, as a calling party identifier.

At item S2c, the AS 120 performs call processing relating to the telephony session based on the first telephony identifier, A. The call processing relating to the telephony session may comprise one or more network resource usage reports being generated based on the first telephony identifier, A. A network resource usage report may be used for billing purposes and may correspond to a billing record. This may, for example, enable the calling party associated with the first telephony identifier, A, to be charged for the telephony session. The call processing relating to the telephony session may comprise one or more originating call services being applied in relation to the telephony session based on the first telephony identifier, A. For example, call barring, call blocking, etc may be applied based on policy for the calling party associated with the first telephony identifier, A. Additional or alternative call services may be invoked. Examples of such call services include, but are not limited to, lawful intercept (LI), Communications Assistance for Law Enforcement Act (CALEA), diagnostics reporting, call logging, network usage reporting etc.

At item S2d, the AS 120 transmits a telephony session establishment request to the IMS core 115. The telephony session establishment request of item S2d comprises the first telephony identifier, A, as a calling party identifier.

At item S2e, the IMS core 115 transmits a telephony session establishment request to the called device 110. The telephony session establishment request of item S2e comprises the first telephony identifier, A, as a calling party identifier.

As such, in this example, the AS 120 performs call processing relating to the telephony session based on the first telephony identifier, A, and the called device 110 receives the telephony session establishment request of item S2e which comprises the first telephony identifier, A, as a calling party identifier. The AS 120 can apply one or more originating call services based on the first telephony identifier, A. The called device 110 may, for example, display the first telephony identifier, A, and/or contact information associated with the first telephony identifier, A, to identify the calling party to the called party. Although not shown in FIG. 2, the AS 120 may be invoked to apply one or more terminating call services in relation to the called party.

Examples will now be described which relate generally, but not exclusively, to intra-group calling. More specifically, some examples that will now be described relate to intra-group calling identification. Intra-group calling identification relates to how members of a given group are identified, for example to each other. Intra-group calling involves a member of a group calling another member of the same group. The group may be a business group, a family group, or any other type of group. Another type of group-based calling is inter-group calling, which involves a member of one group calling a member of another group. As such, in intra-group calling, the calling party and the called party are members of the same group. However, the techniques described herein may alternatively or additionally be applied outside of intra-group calling. For example, the techniques described herein may alternatively or additionally be applied where the calling party is a member of a group and the called party is not a member of the group, where the calling party is not a member of a group and the called party is a member of the group, and/or where neither the calling party nor the called party is a member of a group.

In some examples, a service provider network comprises a network entity that is responsible for real-time billing. Such a network entity may be known as a "billing entity". For Pay As You Go (PAYG) subscribers, such a billing entity may decrement the subscriber's balance, decide if the subscriber has enough credit to continue a call, etc. For contract customers, such a billing entity may monitor the customer's credit cap, limit on monthly minutes, etc. Modifying the behaviour of such a billing entity is, while possible, often very difficult in practice. In practice, a billing entity is often complex and may be heavily integrated into a service provider's network. Such a billing entity can therefore be hard or impossible to modify quickly. Additionally, there may be multiple places in the network where billing is performed.

A network that has a hierarchical subscriber model could be used, such that multiple subscribers can be grouped together under one top-level entry, with billing performed at the scope of that top-level entry. The top-level may correspond to the group and the subscribers may be members of the group. This is possible, in practice, in IMS networks using multiple IP Multimedia Public Identities (IMPUs) under one IMS subscription. However, service providers can find this difficult to manage and configure, in practice. This may also involve modification of the IMS core and/or billings entities. Modifying the IMS core may be undesirable where the IMS core is standards-defined, for example. Such a native IMS solution is also not particularly effective in the case of Bring-Your-Own-Device (BYOD) users, described in more detail herein.

Examples that will now be described can allow an AS in an IMS network to present calls as coming from one telephony identifier, but to perform call processing based on another telephony identifier, without requiring any changes to the wider IMS network or at least limiting the extent of any such changes. In a specific example, an AS in an IMS network can present calls as coming from an individual telephony identifier, with the call being processed based on a shared business telephony identifier, without requiring any changes to the wider IMS network or at least limiting the extent of any such changes. The individual telephony identifier may be a personal telephony identifier of an individual, or a business telephony identifier of an individual. A personal telephony identifier may have been allocated by a service provider to a personal user (as opposed to a business user), and may be associated with a personal account (as opposed to a business account) with the service provider. A business telephony identifier may have been allocated by a service provider to a business user (as opposed to a personal user), and may be associated with a business account (as opposed to a personal account) with the service provider. The processing of the call based on the shared business telephony identifier may involve the call being charged against the shared business telephony identifier (as an alternative or in addition to the call being charged against the personal telephony identifier), call services being applied based on the shared business telephony identifier (as an alternative or in addition to call services being applied based on the personal telephony identifier). As such, calls can be presented to users as personal calls, but can be billed to a business, potentially without requiring any changes to billing entities in the network.

In more detail, in some examples that will now be described, an AS modifies signalling relating to a call when the signalling passes through the network so that the call goes through three distinct phases. In some examples, the AS is invoked exactly twice on each call. The first invocation occurs as the signalling arrives at the service provider network from the originating device, namely the calling device. The first invocation may invoke an originating AS instance, in other words an instance of an originating AS. The second invocation occurs as the signalling heads to the destination device, namely the called device. The second invocation may invoke a terminating AS instance, in other words an instance of a terminating AS. Between the originating AS instance and the terminating AS instance, call processing is performed. Call processing may involve billing and/or invoking one or more call services. One or more ASs that are invoked as the originating and terminating AS instances may perform at least part of the call processing. Alternatively, or additionally, one or more entities other than the one or more ASs that are invoked as the originating and terminating AS instances may perform at least part of the call processing. Such one or more other entities may be comprised in the IMS core, for example.

As such, signalling is sent from the originating device, namely the calling device, to the originating AS instance. The originating AS instance is arranged to be executed early on in the set of network elements the signalling traverses. This may be configured in control logic data. For example, control logic data may indicate which ASs are to be invoked and an order in which those ASs are to be invoked. In particular, the originating AS instance is arranged to be executed before one or more network entities that perform the call processing and before the terminating AS instance.

The originating AS instance changes the calling party identifier for the call to another calling party identifier such that the call appears as a call from the other calling party identifier. The other calling party identifier may comprise a group line identifier. A group line identifier may correspond to an identifier used by a group of users, who are members of the group. The group of users may, for example, correspond to a business, a family etc. The other calling party identifier may alternatively or additionally comprise a per-group-member identifier. Whereas the group line identifier is used by a group of users, the per-group-member identifier is used by a particular member of the group. The per-group-member identifier may be a dedicated identifier used by only one member of the group, for calls made in relation to the group. The per-group-member identifier may comprise a per-group-member business identifier, a per-group-member family identifier etc. The call is then routed through the service provider network to the terminating AS instance under the other calling party identifier. This enables the network to process the call in accordance with the other calling party identifier. For example, this can enable the network to bill the call correctly against a business, rather than against an individual.

The terminating AS instance can change the calling party identifier for the call from the other calling party identifier back to the original calling party identifier, so that the call appears as a call from the original calling party identifier. The terminating AS instance is arranged to be executed late on in the set of network elements the call traverses. In particular, the terminating AS instance is arranged to be executed after the originating AS instance and after one or more network entities that perform the call processing.

In some examples, the originating and terminating AS instances and the one or more network entities that perform the call processing are all under the control of the same service provider. In some examples, the original calling party identifier, the other calling party identifier, and the called party identifier are all owned by the same service provider.

In some examples, the changing of one call party identifier to another call party identifier results in changing the values of more than one field in the signalling. Such changing may, for example, involve replacing a first calling and/or called party identifier with a second calling and/or called party identifier and recording the first calling and/or called party identifier in one or more fields in the signalling other than a calling party and/or called party field. Such changing may, for example, involve extracting a first calling and/or called party identifier from one or more fields in the signalling other than a calling party and/or called party field, and replacing a second calling and/or called party identifier in a calling party and/or called party field with the first calling and/or called party identifier. The way in which call party identifiers are changed in this way may depend, for example, on the protocols and/or network architectures being used.

Examples described herein provide various additional features. One such feature is to enable a call from a first call party identifier to be handled in relation to a second, different call party identifier, while still presenting the call to the called party as originating from the first call party identifier. For example, a call made from an individual call party identifier can be billed against a group line identifier but can be made to appear to the called party to be from the individual call party identifier. This can enable the called party to identify the individual from the group that is making the call, while still enabling the individual making the call not to be charged for making the call on behalf of the group. For intra-group calls, the call can be routed through the IMS core as a call originating from the second, different call party identifier (for example a group line identifier) but can then be sent to the called device as a call originating from the first call party identifier (for example an individual line identifier, such as a personal line). As such, billing logs can bill the call against the second call party identifier (for example in the IMS multimedia telephony service (MMTel), etc.), but the called party can still see who the call came from via the first call party identifier.

Figure 3:
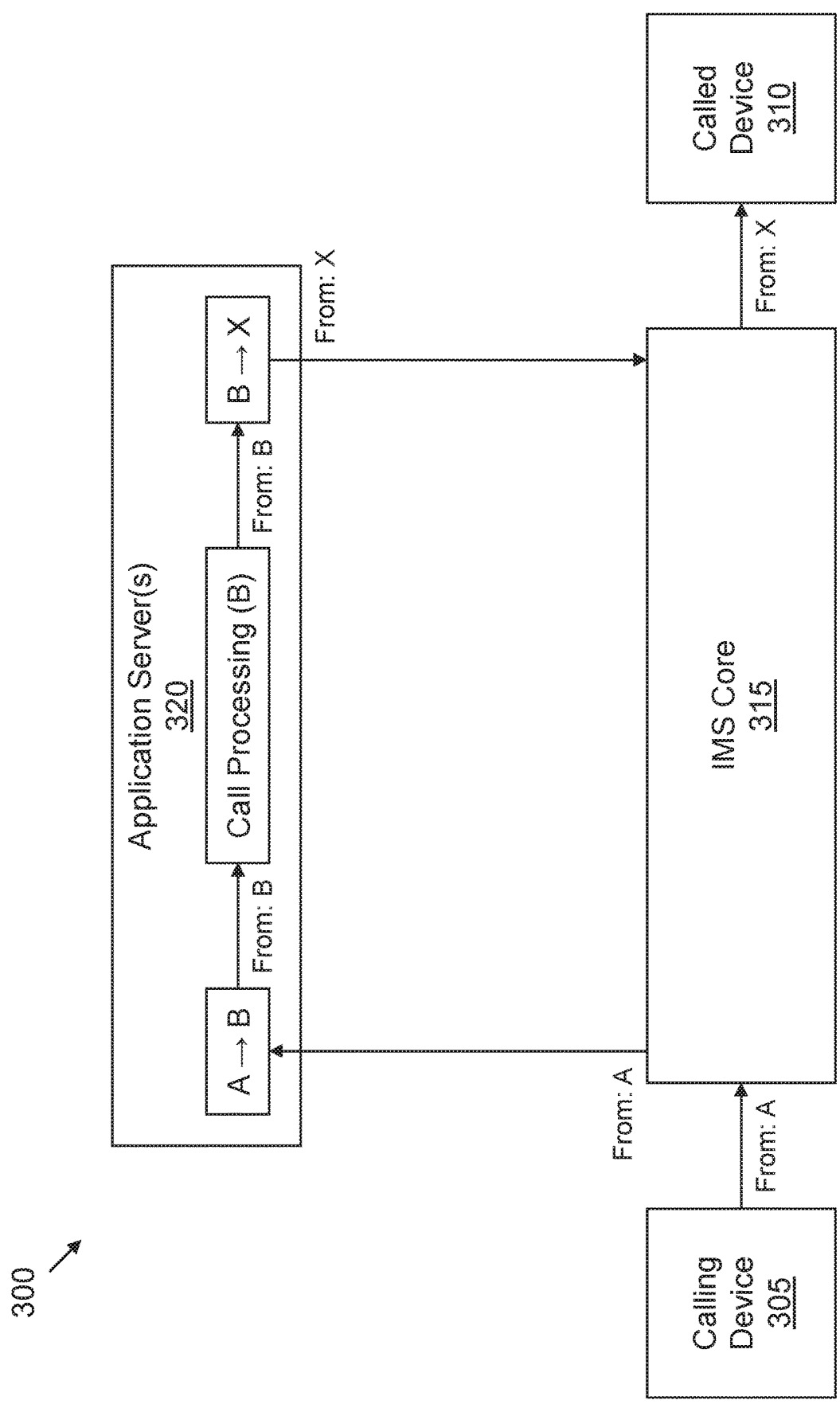
FIG. 3 shows a schematic block diagram of an example of a network in accordance with embodiments.

Referring to FIG. 3, there is shown schematically an example of a network 300. The network 300 has elements that are the same as or are similar to corresponding elements of the network 100 described above. Such elements are indicated using the same reference numeral as that used in FIG. 1, but incremented by 200.

This example involves various telephony identifiers, including the first telephony identifier, A, a second telephony identifier, B, and a telephony identifier, X, other than the second telephony identifier, B. The second telephony identifier, B, is different from the first telephony identifier, A. The other telephony identifier, X, is different from the second telephony identifier, B. In some examples, the other telephony identifier, X, comprises the first telephony identifier, A. In other examples, the other telephony identifier, X, does not comprise the first telephony identifier, A. In this example, the second telephony identifier, B, identifies a group line. The calling and called parties may be associated with the group line. The second telephony identifier, B, may comprise a landline number, for example. In some examples, the first and second telephony identifiers, A, B, comprise different types of telephony identifier.

Figure 4:
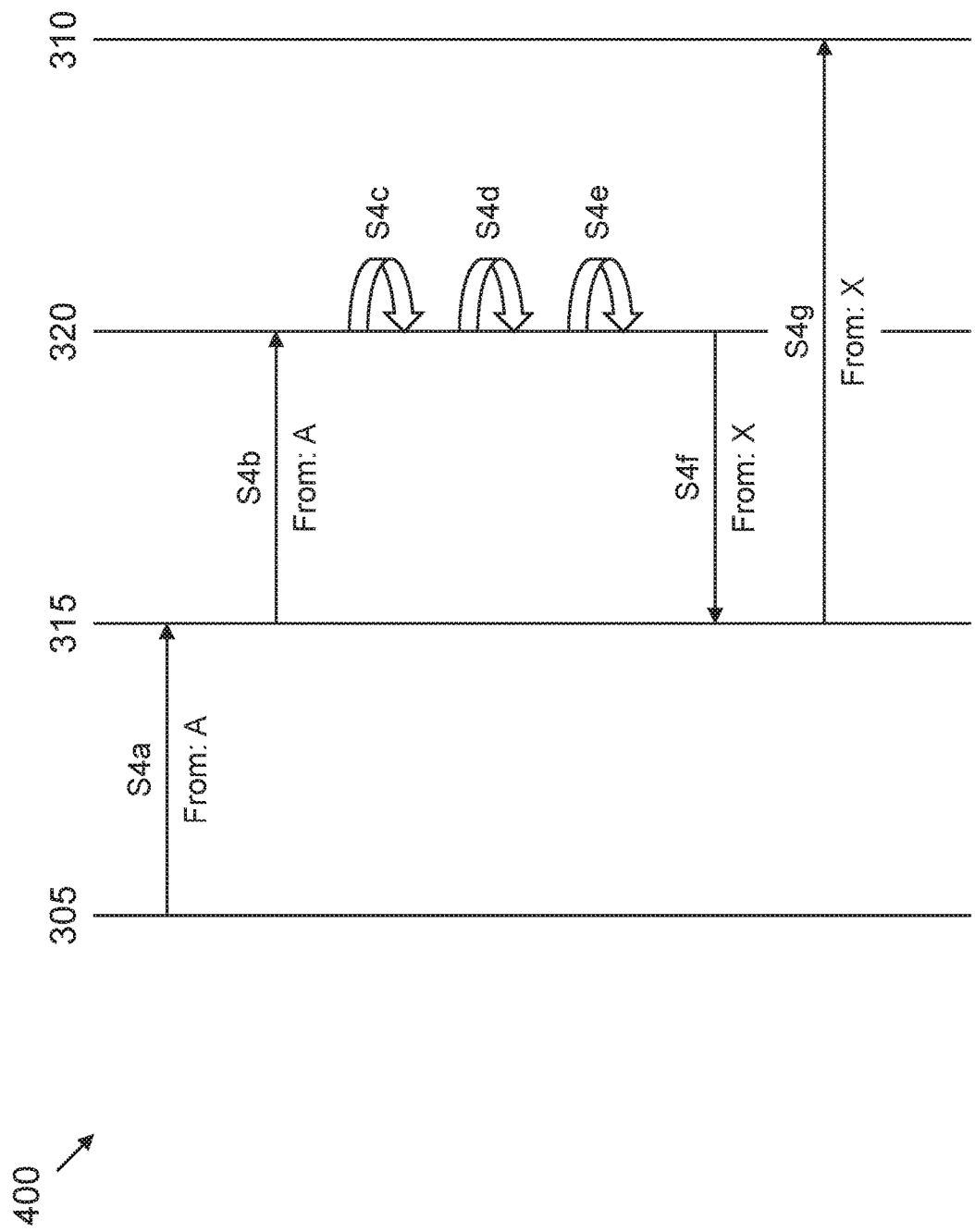
FIG. 4 shows a sequence diagram representing an example of a method in accordance with embodiments, the method being performed in the example network shown in FIG. 3.

Referring to FIG. 4, there is shown schematically an example of a method 400 performed in the network 300 shown schematically in FIG. 4. The method 400 is an example of a method of processing signalling relating to a telephony session. In this example, the method 400 is performed by one or more ASs 320. In this example, various telephony session establishment requests are communicated. In this specific example, the telephony session establishment requests are in the form of SIP INVITEs.

At item S4a, the calling device 305 transmits a telephony session establishment request to the IMS core 315. The telephony session establishment request of item S4a may be transmitted in response to user input at the calling device 305. The telephony session establishment request of item S4a comprises the first telephony identifier, A, as a calling party identifier.

At item S4b, the IMS core 315 transmits a telephony session establishment request to the AS 320. This may be based on control logic data associated with the first telephony identifier, A. For example, iFC data associated with the first telephony identifier, A, may indicate that the AS 320 is to be invoked for telephony sessions originating from the calling device 305. The IMS core 315 may transmit the telephony session establishment request of item S4b in response to receiving the telephony session establishment request of item S4a. The telephony session establishment request of item S4b comprises the first telephony identifier, A, as a calling party identifier.

At item S4c, the AS 320 replaces the first telephony identifier, A, with the second telephony identifier, B. The AS 320 may perform the replacing of item S4c in response to receiving the telephony session establishment request of item S4b. The replacing of item S4c may comprise the AS 320 extracting the first telephony identifier, A, from the telephony session establishment request of item S4b and using the extracted first telephony identifier, A, to identify the second telephony identifier, B. This may, for example, comprise the AS 320 using the first telephony identifier, A, as a key into a mapping database, with the second telephony identifier, B, being the corresponding value in the database.

At item S4d, the AS 320 enables call processing relating to the telephony session to be performed based on the second telephony identifier, B. The AS 320 may perform the enabling of item S4d in response to the replacing of item S4c being performed.

In some examples, the enabling of item S4d comprises the AS 320 performing at least some of the call processing relating to the telephony session.

In some examples, the enabling of item S4d comprises at least one network entity other than the AS 320 performing at least some of the call processing relating to the telephony session. For example, the AS 320 may transmit predetermined data to cause and/or allow the at least one network entity other than the AS 320 to perform the at least some of the call processing relating to the telephony session.

At item S4e, the AS 320 replaces the second telephony identifier, B, with the telephony identifier, X, other than the second telephony identifier, B. The AS 320 may perform the replacing of item S4e in response to the enabling of item S4d being performed. The replacing of item S4e may comprise the AS 320 the second telephony identifier, B, as a key into a mapping database, potentially with additional data, with the other telephony identifier, X, being the corresponding value in the database.

At item S4f, the AS 320 transmits a telephony session establishment request to the IMS core 315. The AS 320 may transmit the telephony session establishment request of item S4f in response to the replacing of item S4e being performed. The telephony session establishment request of item S4f comprises the other telephony identifier, X, as a calling party identifier.

At item S4g, the IMS core 315 transmits a telephony session establishment request to the called device 310. The IMS core 315 may transmit the telephony session establishment request of item S4g in response to receiving the telephony session establishment request of item S4f. The telephony session establishment request of item S4g comprises the other telephony identifier, X, as a calling party identifier.

As such, in this example, the AS 320 performs call processing relating to the telephony session based on the second telephony identifier, B, and the called device 310 receives the telephony session establishment request of item S4g which comprises the other telephony identifier, X, as a calling party identifier. The called device 310 may, for example, display the other telephony identifier, X, and/or contact information associated with the other telephony identifier, X, to identify the calling party to the called party.

This example method 400 therefore differs from the example method 200 described above in that call processing relating to the telephony session based on the second telephony identifier, B.

In this example, a single instance of the AS 320 is invoked once, and that instance of the AS 320 performs the replacing of item S4c, the enabling of item S4d and the replacing of item S4e. In other examples, a given AS 320 may be invoked multiple times and/or multiple different ASs 320 may be invoked.

Figure 5:
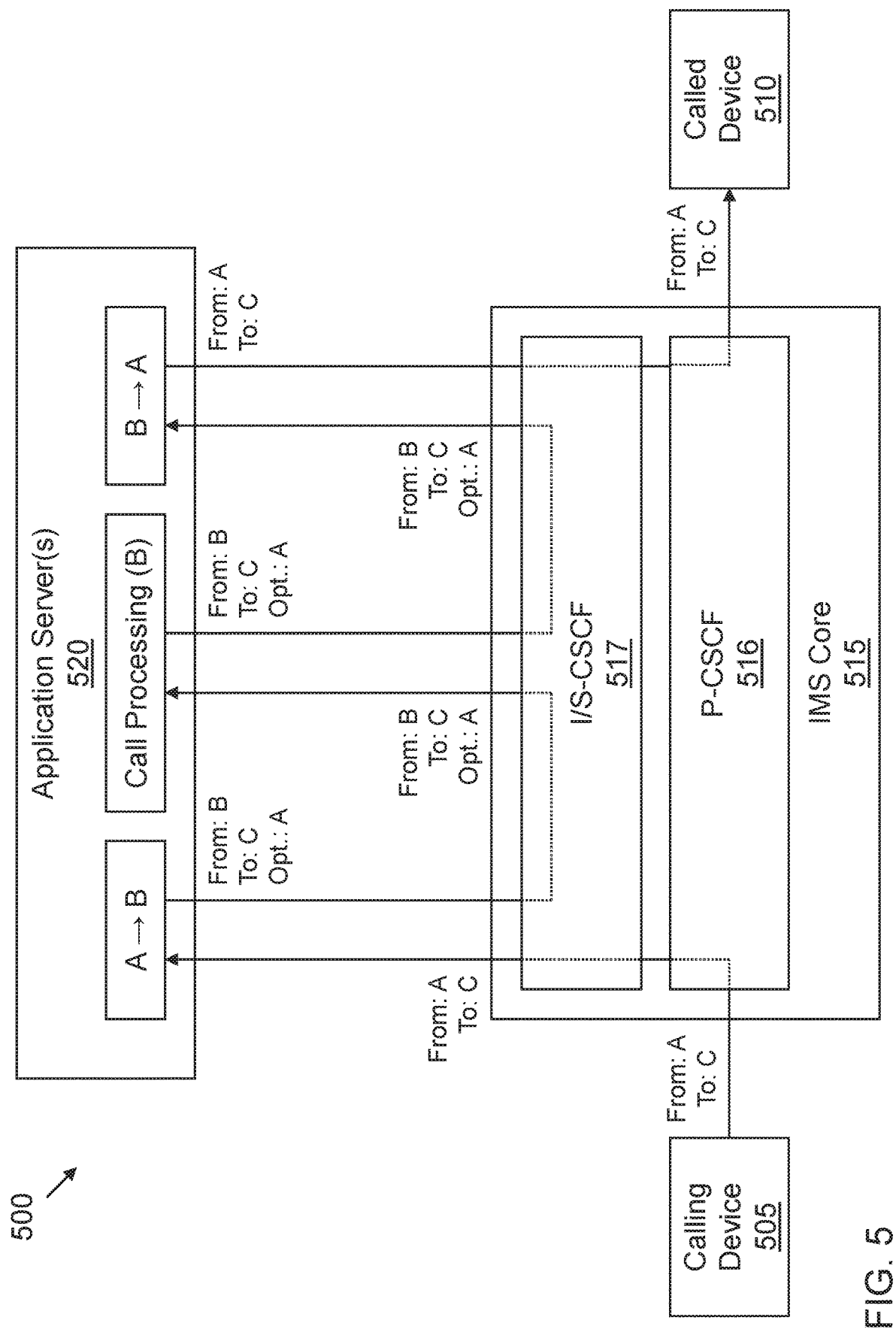
FIG. 5 shows a schematic block diagram of another example of a network in accordance with embodiments.

Referring to FIG. 5, there is shown schematically an example of a network 500. The network 500 has elements that are the same as or are similar to corresponding elements of the network 300 described above. Such elements are indicated using the same reference numeral as that used in FIG. 3, but incremented by 200.

This example involves various telephony identifiers, including the first telephony identifier, A, the second telephony identifier, B, and a third telephony identifier, C. The third telephony identifier, C, is different from the first and second telephony identifiers, A, B. In this example, the third telephony identifier C is associated with the called device 510. The third telephony identifier, C, may comprise a mobile telephone number, for example. The mobile telephone number may be associated with a SIM card of the called device 510.

This example relates to an intra-group call where the terminating group member is on-net. In this example, the originating group member is also on-net. As such, both the calling party and the called party are members of the group and both the calling party and the called party are served by the service provider associated with the IMS core 515 and AS 520. In this example, the calling party is an on-net originating party. In such examples, the calling party receives telephony services from a service provider associated with the originating AS instance. For an on-net originating party, the originating AS instance is invoked by the network on behalf of the on-net originating user.

FIG. 5 depicts several elements of the IMS core 515. In this example, the IMS core 515 comprises a P-CSCF 516 and an I/S-CSCF 517. The I/S-CSCF 517 has the combined functionality of an I-CSCF and an S-CSCF.

Figure 6A:
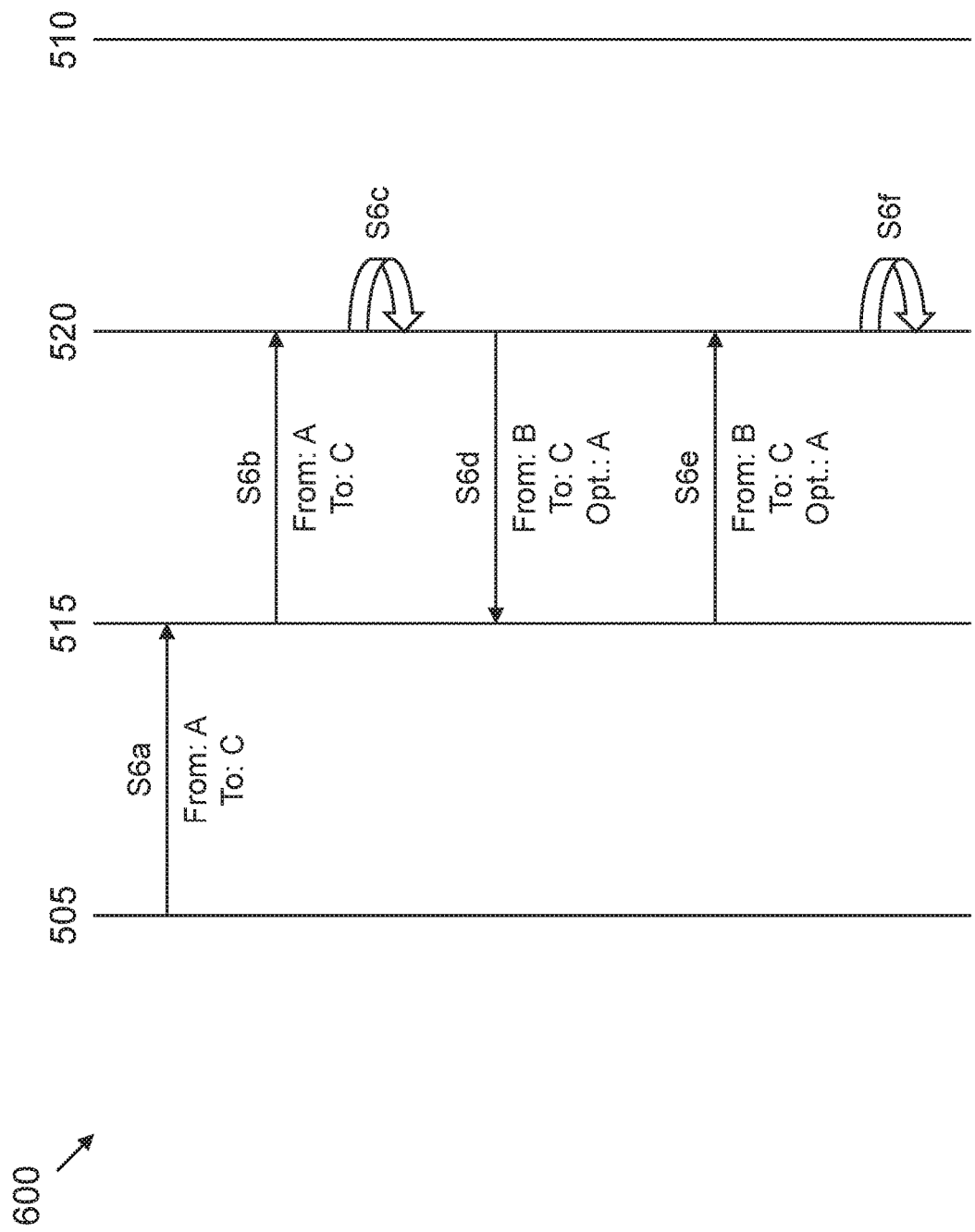
FIGS. 6A and 6B show a sequence diagram representing another example of a method in accordance with embodiments, the method being performed in the example network shown in FIG. 5.
Figure 6B:
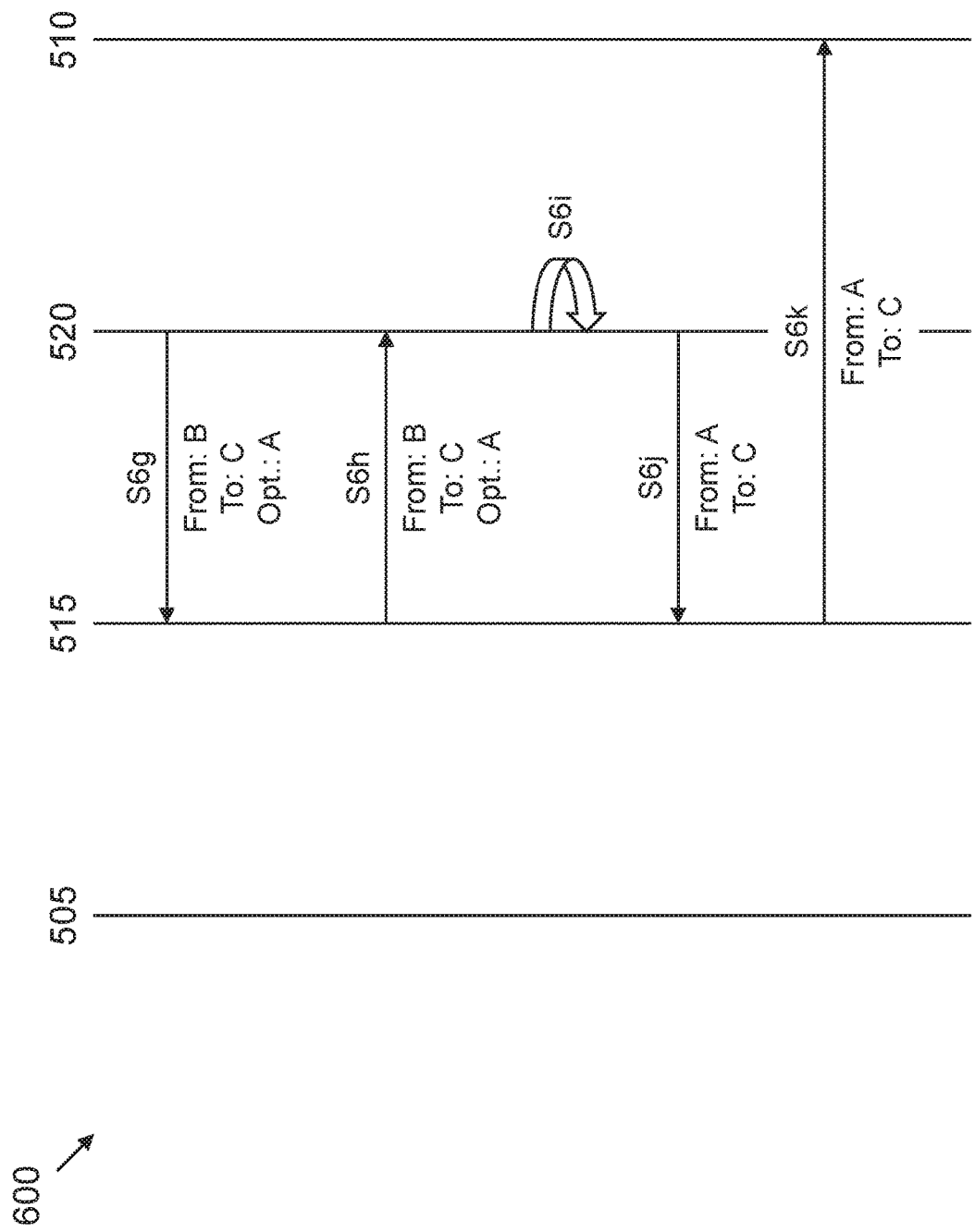

Referring to FIGS. 6A and 6B, there is shown schematically an example of a method 600 performed in the network 500 shown schematically in FIG. 5. The method 600 is an example of a method of processing signalling relating to a telephony session. In this example, the method 600 is performed by one or more ASs 620. In this example, various telephony session establishment requests are communicated. In this specific example, the telephony session establishment requests are in the form of SIP INVITEs.

At item S6a, the calling device 505 transmits a telephony session establishment request to the IMS core 515. The telephony session establishment request of item S6a may be transmitted in response to user input at the calling device 505. The telephony session establishment request of item S6a comprises the first telephony identifier, A, as a calling party identifier and comprises the third telephony identifier, C, as a called party identifier. The telephony session establishment request of item S6a does not comprise the second telephony identifier, B. In this specific example, the calling device 505 transmitting the telephony session establishment request of item S6a to the IMS core 515 comprises the calling device 505 transmitting the telephony session establishment request of item S6a to the P-CSCF 516.

At item S6b, the IMS core 515 transmits a telephony session establishment request to the AS 520. This may be based on control logic data associated with the first telephony identifier, A. For example, iFC data associated with the first telephony identifier, A, may indicate that the AS 520 is to be invoked for telephony sessions originating from the calling device 505. The IMS core 515 may transmit the telephony session establishment request of item S6b in response to receiving the telephony session establishment request of item S6a. The telephony session establishment request of item S6b comprises the first telephony identifier, A, as a calling party identifier and comprises the third telephony identifier, C, as a called party identifier. The telephony session establishment request of item S6b does not comprise the second telephony identifier, B. In this specific example, the IMS core 515 transmitting the telephony session establishment request of item S6b to the AS 520 comprises the P-CSCF 516 transmitting the telephony session establishment request of item S6b to the I/S-CSCF 517, the I/S-CSCF 517 determining that the AS 520 is to be invoked based on control logic data associated with the first telephony identifier, A, and the I/S-CSCF 517 transmitting the telephony session establishment request of item S6b to the AS 520.

At item S6c, the AS 520 replaces the first telephony identifier, A, with a second telephony identifier, B. The AS 520 may perform the replacing of item S6c in response to receiving the telephony session establishment request of item S6b. The replacing of item S6c may comprise the AS 520 extracting the first telephony identifier, A, from the telephony session establishment request of item S6b and using the extracted first telephony identifier, A, to identify the second telephony identifier, B. This may, for example, comprise the AS 520 using the first telephony identifier, A, as a key into a mapping database, with the second telephony identifier, B, being the corresponding value in the database.

At item S6d, the AS 520 transmits a telephony session establishment request to the IMS core 515. The AS 520 may transmit the telephony session establishment request of item S6d in response to the replacing of item S6c being performed. The telephony session establishment request of item S6d comprises the second telephony identifier, B, as a calling party identifier and comprises the third telephony identifier, C, as a called party identifier. The telephony session establishment request of item S6d also comprises the first telephony identifier, A. In this example, the first telephony identifier, A, is comprised in a field other than a calling party identification field. The field in which the first telephony identifier, A, is comprised may be a custom field. One or more downstream network entities may use the first telephony identifier, A, comprised in the telephony session establishment request of item S6d, for example by extracting the first telephony identifier, A, from the telephony session establishment request of item S6d and/or from signalling derived from the telephony session establishment request of item S6d. In this specific example, the AS 520 transmitting the telephony session establishment request of item S6d to the IMS core 515 comprises the AS 520 transmitting the telephony session establishment request of item S6d to the I/S-CSCF 517.

At item S6e, the IMS core 515 transmits a telephony session establishment request to the AS 520. The IMS core 515 may transmit the telephony session establishment request of item S6e in response to receiving the telephony session establishment request of item S6d. The telephony session establishment request of item S6e comprises the second telephony identifier, B, as a calling party identifier and the third telephony identifier, C, as a called party identifier. The telephony session establishment request of item S6e comprises the first telephony identifier, A. In this specific example, the IMS core 515 transmitting the telephony session establishment request of item S6e to the AS 520 comprises the I/S-CSCF 517 determining that the AS 520 is to be invoked based on control logic data associated with the first telephony identifier, A, and the I/S-CSCF 517 transmitting the telephony session establishment request of item S6e to the AS 520.

At item S6f, the AS 520 performs call processing relating to the telephony session based on the second telephony identifier, B. The AS 520 may perform the call processing of item S6f in response to receiving the telephony session establishment request of item S6e.

At item S6g, the AS 520 transmits a telephony session establishment request to the IMS core 515. The AS 520 may transmit the telephony session establishment request of item S6g in response to the performing of item S6f. The telephony session establishment request of item S6g comprises the second telephony identifier, B, as a calling party identifier and comprises the third telephony identifier, C, as a called party identifier. The telephony session establishment request of item S6g comprises the first telephony identifier, A. In this specific example, the AS 520 transmitting the telephony session establishment request of item S6g to the IMS core 515 comprises the AS 520 transmitting the telephony session establishment request of item S6g to the I/S-CSCF 517.

At item S6h, the IMS core 515 transmits a telephony session establishment request to the AS 520. The IMS core 515 may transmit the telephony session establishment request of item S6h in response to receiving the telephony session establishment request of item S6g. The telephony session establishment request of item S6h comprises the second telephony identifier, B, as a calling party identifier and comprises the third telephony identifier, C, as a called party identifier. The telephony session establishment request of item S6h comprises the first telephony identifier, A. In this specific example, the IMS core 515 transmitting the telephony session establishment request of item S6h to the AS 520 comprises the I/S-CSCF 517 determining that the AS 520 is to be invoked based on control logic data associated with the first telephony identifier, A, and the I/S-CSCF 517 transmitting the telephony session establishment request of item S6h to the AS 520.

At item S6i, the AS 520 replaces the second telephony identifier, B, with the first telephony identifier, A. The AS 520 may perform the replacing of item S6i in response to receiving the telephony session establishment request of item S6h. The AS 520 may extract the first telephony identifier, A, from the telephony session establishment request of item S6h to perform the replacing. The replacing of item S6i may comprise the AS 520 extracting the first telephony identifier, A, from the telephony session establishment request of item S6h.

At item S6j, the AS 520 transmits a telephony session establishment request to the IMS core 515. The AS 520 may transmit the telephony session establishment request of item S6j in response to the replacing of S6i being performed. The telephony session establishment request of item S6j comprises the first telephony identifier, A, as a calling party identifier and comprises the third telephony identifier, C, as a called party identifier. The telephony session establishment request of item S6j does not comprise the second telephony identifier, B. In this specific example, the AS 520 transmitting the telephony session establishment request of S6j to the IMS core 515 comprises the AS 520 transmitting the telephony session establishment request of S6j to the I/S-CSCF 517 and the I/S-CSCF 517 transmitting the telephony session establishment request of S6j to the P-CSCF 516.

At item S6k, the IMS core 515 transmits a telephony session establishment request to the called device 510. The IMS core 515 may transmit the telephony session establishment request of item S6k in response to receiving the telephony session establishment request of item S6j. The telephony session establishment request of item S6k comprises the first telephony identifier, A, as a calling party identifier and comprises the third telephony identifier, C, as a called party identifier. The telephony session establishment request of item S6k does not comprise the second telephony identifier, B. In this specific example, the IMS core 515 transmitting the telephony session establishment request of S6k to the called device 510 comprises the P-CSCF 516 transmitting the telephony session establishment request of S6k to the called device 510.

As such, in this example, the AS 520 performs call processing relating to the telephony session based on the second telephony identifier, B, and the called device 510 receives the telephony session establishment request of item S6k which comprises the first telephony identifier, A, as a calling party identifier. The called device 510 may, for example, display the first telephony identifier, A, and/or contact information associated with the first telephony identifier, A, to identify the calling party to the called party.

Figure 7:
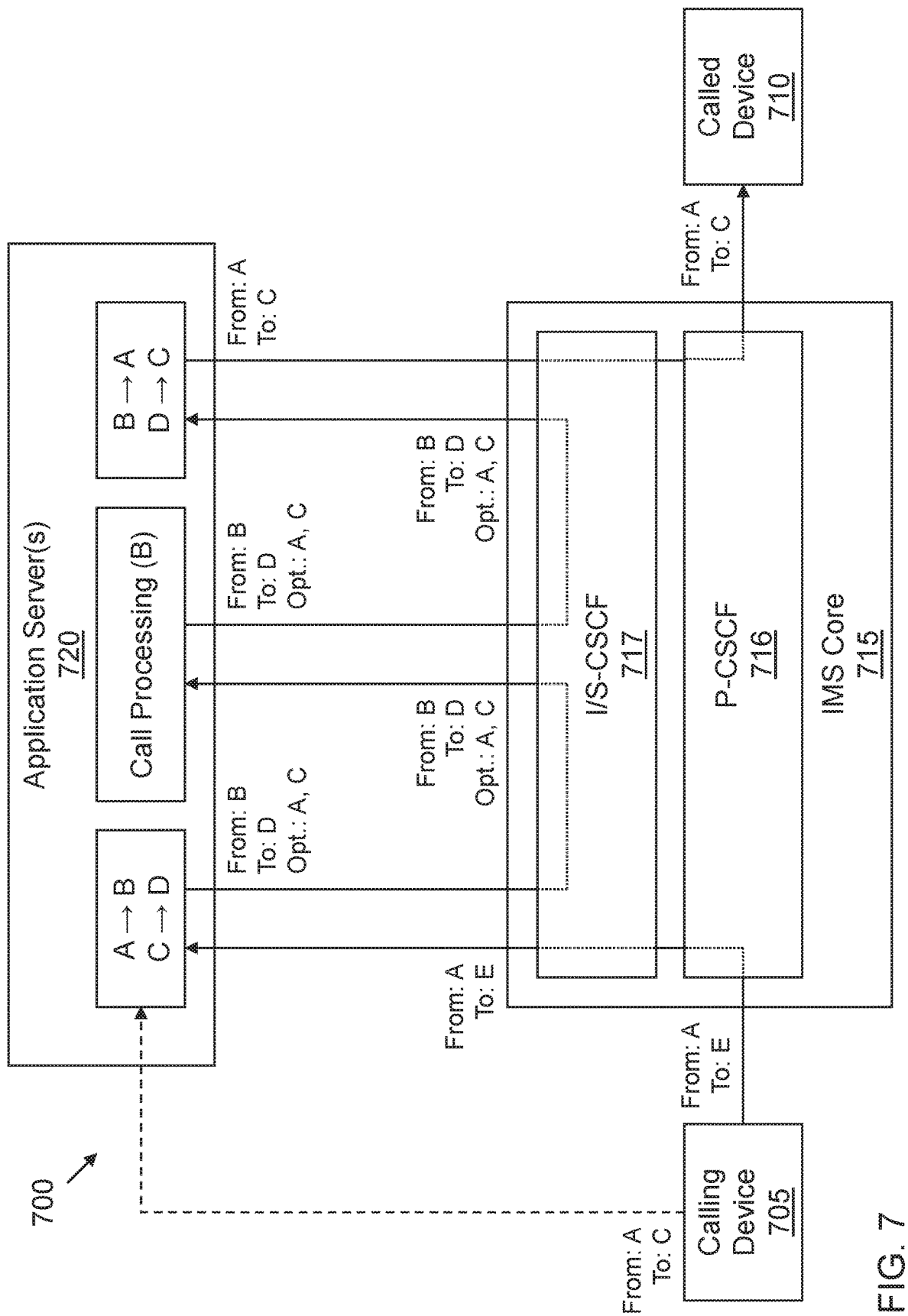
FIG. 7 shows a schematic block diagram of another example of a network in accordance with embodiments.

Referring to FIG. 7, there is shown schematically an example of a network 700. The network 700 has elements that are the same as or are similar to corresponding elements of the network 500 described above. Such elements are indicated using the same reference numeral as that used in FIG. 5, but incremented by 200.

This example involves various telephony identifiers, including the first telephony identifier, A, the second telephony identifier, B, the third telephony identifier, C, a fourth telephony identifier, D, and a fifth telephony identifier, E. The fourth and fifth telephony identifiers, D, E are different from the first, second and third telephony identifiers, A, B, C and are different from each other. In some examples, the method 700 is performed in a service provider network associated with a given service provider and the fourth telephony identifier, D, is a local telephony identifier configured to be recognised in the service provider network and configured to not be recognised outside the service provider network. The fourth telephony identifier, D, may comprises a SIP URI, for example. The fourth telephony identifier, D, may comprise the third telephony identifier, C. As such, the third telephony identifier, C may be extracted from the fourth telephony identifier, D. For example, the fourth telephony identifier, D, may be in the form C@domain. The fifth telephony identifier, E, may be an access number associated with the AS 720.

This example relates to an intra-group call where the terminating group member is a BYOD user. In this example, the originating group member is also a BYOD user. As such, both the calling party and the called party are members of the group and both the calling party and the called party are not served by the service provider associated with the IMS core 715 and AS 720. In this example, the calling party is a BYOD originating party. An off-net originating party may also be referred to as an "external originating party" or an "off-net originating party". In such examples, the calling party does not receive telephony services from a service provider associated with the originating AS instance. For a BYOD originating party, the originating application server instance may be invoked as a result of the BYOD originating party calling a given service access number associated with the originating AS instance, namely the fifth telephony identifier, E. In more detail, a BYOD device may comprise a function for intercepting outgoing calls. The function may identify that a call is to be routed to the originating AS instance. The BYOD device may place an outgoing call to the given service access number instead of to the ultimate destination. The outgoing call would be routed by the other service provider network to the originating AS instance, to cause the originating AS instance to be invoked. The BYOD device could then provide the original called party identifier to the originating AS instance separately. For example, the BYOD device could provide the original called party identifier to the originating AS instance via a HyperText Transfer Protocol (HTTP). The originating AS could identify the calling party identifier from the incoming signalling from the other service provider network. As such, the calling device 705 and the terminating device 710 may be BYOD device, which are, in effect, pulled into the service provider network via the access number and access mechanism described above.

Figure 8A:
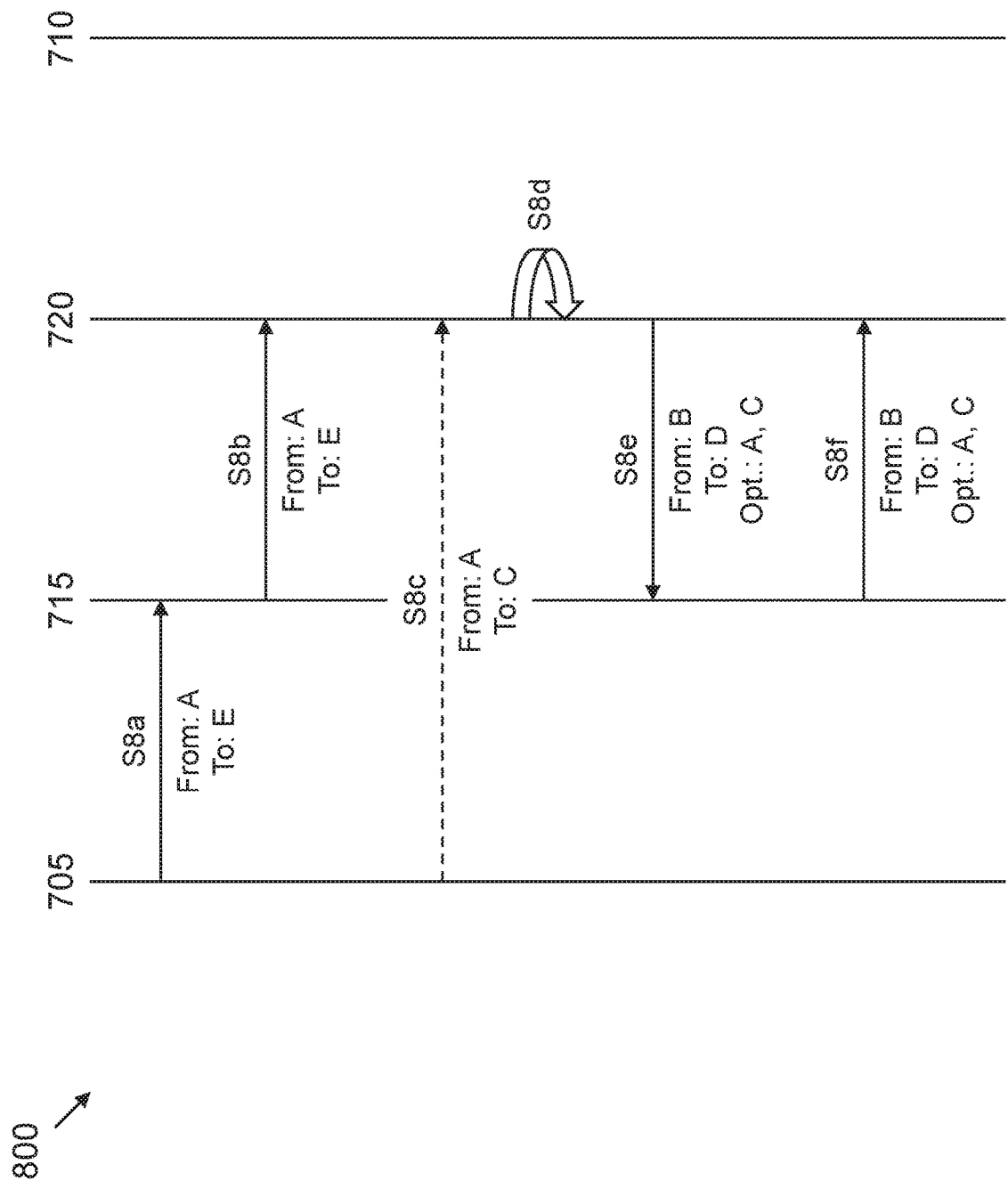
FIGS. 8A and 8B show a sequence diagram representing another example of a method in accordance with embodiments, the method being performed in the example network shown in FIG. 7.
Figure 8B:
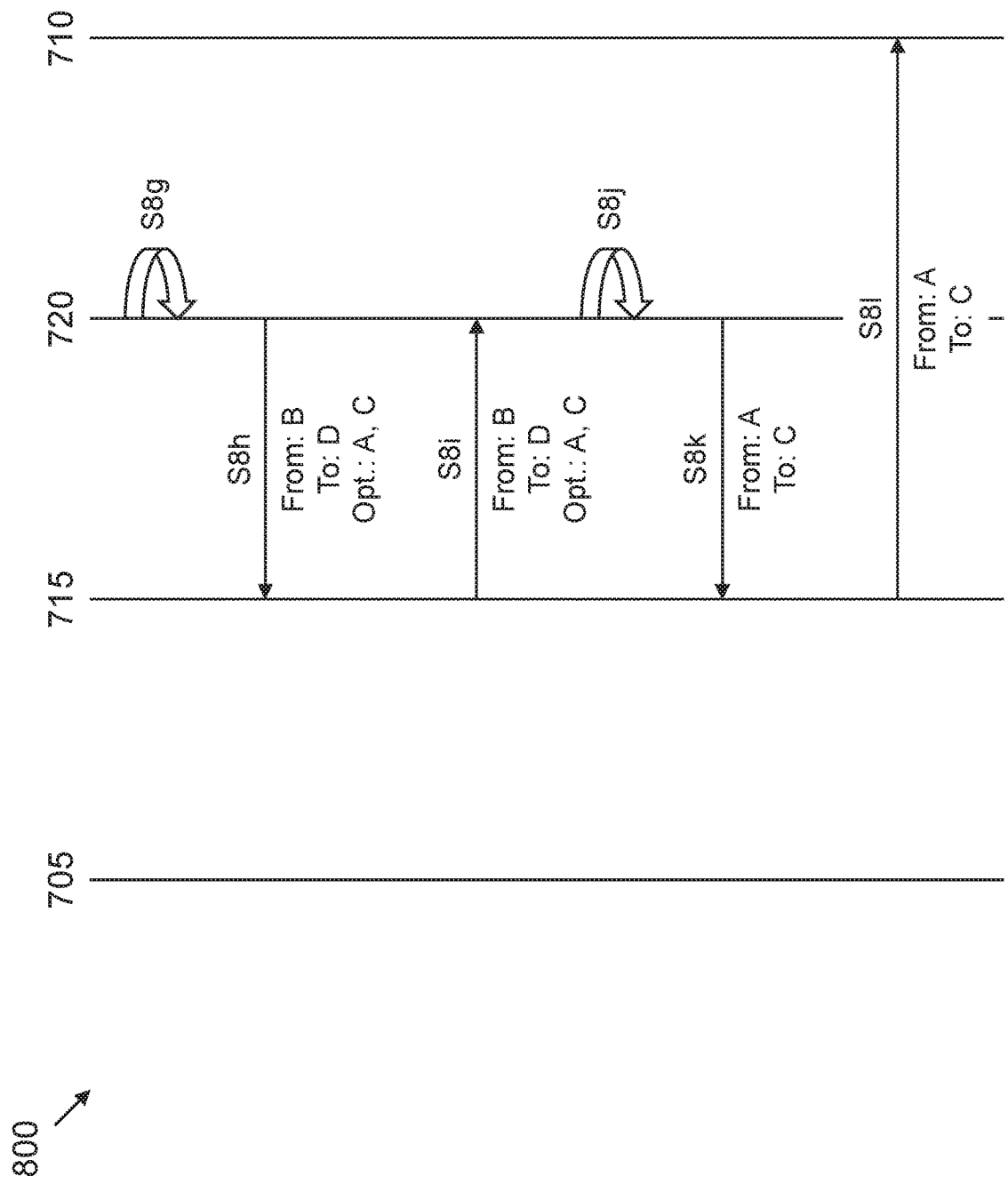

Referring to FIGS. 8A and 8B, there is shown schematically an example of a method 800 performed in the network 700 shown schematically in FIG. 7. The method 800 is an example of a method of processing signalling relating to a telephony session. In this example, the method 800 is performed by one or more ASs 720. In this example, various telephony session establishment requests are communicated. In this specific example, the telephony session establishment requests are in the form of SIP INVITEs.

At item S8a, the calling device 705 transmits a telephony session establishment request to the IMS core 715. The telephony session establishment request of item S8a may be transmitted in response to user input at the calling device 705. The telephony session establishment request of item S8a comprises the first telephony identifier, A, as a calling party identifier and comprises the fourth telephony identifier, E, as a called party identifier. The telephony session establishment request of item S8a does not comprise any of the second, third or fourth telephony identifiers, B, C, D. In this specific example, the calling device 705 transmitting the telephony session establishment request of item S8a to the IMS core 715 comprises the calling device 705 transmitting the telephony session establishment request of item S8a to the P-CSCF 716.

At item S8b, the IMS core 715 transmits a telephony session establishment request to the AS 720. The IMS core 715 may transmit the telephony session establishment request of item S8b in response to receiving the telephony session establishment request of item S8a. The telephony session establishment request of item S8b comprises the first telephony identifier, A, as a calling party identifier and comprises the fifth telephony identifier, E, as a called party identifier. The telephony session establishment request of item S8b does not comprise any of the second, third and fourth telephony identifiers, B, C, D. In this specific example, the IMS core 715 transmitting the telephony session establishment request of item S8b to the AS 720 comprises the P-CSCF 716 transmitting the telephony session establishment request of item S8b to the I/S-CSCF 717, the I/S-CSCF 717 determining that the AS 720 is to be invoked based on control logic data associated with the first telephony identifier, A, and the I/S-CSCF 717 transmitting the telephony session establishment request of item S8b to the AS 720.

At item S8c, the calling device 705 transmits data to the AS 720. In this example, the data of item S8c comprises the first and third telephony identifiers, A, C.

At item S8d, the AS 720 correlates the telephony session establishment request of item S8b and the data of item S8c and determines that the calling party wishes to call the called device 710 that is associated with the third telephony identifier, C. The AS 720 replaces the first telephony identifier, A, with the second telephony identifier, B. The AS 720 may perform the replacing of item S8c in response to receiving the telephony session establishment request of item S8b. At item S8c, the AS 720 also replaces the third telephony identifier, C, with the fourth telephony identifier, D. The third telephony identifier, C, is comprised in the data of item S8c.

At item S8e, the AS 720 transmits a telephony session establishment request to the IMS core 715. The AS 720 may transmit the telephony session establishment request of item S8e in response to the replacing of item S8d being performed. The telephony session establishment request of item S8e comprises the second telephony identifier, B, as a calling party identifier and comprises the fourth telephony identifier, D, as a called party identifier. The telephony session establishment request of item S8e comprises the first and third telephony identifiers, A, C. In this specific example, the AS 720 transmitting of the telephony session establishment request of item S8e to the IMS core 715 comprises the AS 720 transmitting the telephony session establishment request of item S8e to the I/S-CSCF 717. Although, in this specific example, the telephony session establishment request of item S8e comprises the third telephony identifier, C, in a custom field, as indicated above, in some examples, the third telephony identifier, C, is comprised in the fourth telephony identifier, D. In such examples, the third telephony identifier, C, is still comprised in the telephony session establishment request of item S8e, by virtue of being comprised in the fourth telephony identifier, D.

At item S8f, the IMS core 715 transmits a telephony session establishment request to the AS 720. The IMS core 715 may transmit the telephony session establishment request of item S8e in response to receiving the telephony session establishment request of item S8e. The telephony session establishment request of item S8f comprises the second telephony identifier, B, as a calling party identifier and comprises the fourth telephony identifier, D, as a called party identifier. The telephony session establishment request of item S8f comprises the first and third telephony identifiers, A, C. In this specific example, the IMS core 715 transmitting the telephony session establishment request of item S8f to the AS 720 comprises the I/S-CSCF 717 determining that the AS 720 is to be invoked based on control logic data associated with the first telephony identifier, A, and the I/S-CSCF 717 transmitting the telephony session establishment request of item S8f to the AS 720.

At item S8g, the AS 720 performs call processing relating to the telephony session based on the second telephony identifier, B. The AS 720 may perform the call processing of item S8g in response to receiving the telephony session establishment request of item S8f.

At item S8h, the AS 720 transmits a telephony session establishment request to the IMS core 715. The AS 720 may transmit the telephony session establishment request of item S8h in response to the performing of item S8g. The telephony session establishment request of item S8h comprises the second telephony identifier, B, as a calling party identifier and comprises the fourth telephony identifier, D, as a called party identifier. The telephony session establishment request of item S8h comprises the first and third telephony identifiers, A, C. In this specific example, the AS 720 transmitting the telephony session establishment request of item S8h to the IMS core 715 comprises the AS 720 transmitting the telephony session establishment request of item S8h to the I/S-CSCF 717.

At item S8i, the IMS core 715 transmits a telephony session establishment request to the AS 720. The IMS core 715 may transmit the telephony session establishment request of item S8i in response to receiving the telephony session establishment request of item S8h. The telephony session establishment request of item S8i comprises the second telephony identifier, B, as a calling party identifier and comprises the fourth telephony identifier, D, as a called party identifier. The telephony session establishment request of item S8i comprises the first and third telephony identifiers, A, C. In this specific example, the IMS core 715 transmitting the telephony session establishment request of item S8i to the AS 720 comprises the I/S-CSCF 717 determining that the AS 720 is to be invoked based on control logic data associated with the first telephony identifier, A, and the I/S-CSCF 717 transmitting the telephony session establishment request of item S8i to the AS 720.

At item S8j, the AS 720 replaces the second telephony identifier, B, with the first telephony identifier, A. At item S8j, the AS 720 also replaces the fourth telephony identifier, D, with the third telephony identifier, C. The AS 720 may perform the replacing of item S8j in response to receiving the telephony session establishment request of item S8i. The replacing of item 8j may comprise the AS 720 extracting the first and third telephony identifiers, A, C, from the telephony session establishment request of item S8i. In some examples, extracting the third telephony identifier, C, comprises extracting the third telephony identifier, C, from a custom field. In some examples, where the third telephony identifier, C, is comprised in the fourth telephony identifier, D, extracting the third telephony identifier, C, comprises extracting the fourth telephony identifier, D, and extracting the third telephony identifier, C, from the fourth telephony identifier, D.

At item S8k, the AS 720 transmits a telephony session establishment request to the IMS core 715. The AS 720 may transmit the telephony session establishment request of item S8k in response to the replacing of S8j being performed. The telephony session establishment request of item S8k comprises the first telephony identifier, A, as a calling party identifier and comprises the third telephony identifier, C, as a called party identifier. The telephony session establishment request of item S8k does not comprise either the second or fourth telephony identifiers, B, D. In this specific example, the AS 720 transmitting the telephony session establishment request of S8k to the IMS core 715 comprises the AS 720 transmitting the telephony session establishment request of S8k to the I/S-CSCF 717 and the I/S-CSCF 717 transmitting the telephony session establishment request of S8k to the P-CSCF 716.

At item S8l, the IMS core 715 transmits a telephony session establishment request to the called device 710. The IMS core 715 may transmit the telephony session establishment request of item S8l in response to receiving the telephony session establishment request of item S8k. The telephony session establishment request of item S8*l* comprises the first telephony identifier, A, as a calling party identifier and comprises the third telephony identifier, C, as a called party identifier. The telephony session establishment request of item S8*l* does not comprise either of the second or fourth telephony identifiers, B, D. In this specific example, the IMS core 715 transmitting the telephony session establishment request of S8*l* to the called device 710 comprises the P-CSCF 716 transmitting the telephony session establishment request of S8*l* to the called device 710.

As such, in this example, the AS 720 performs call processing relating to the telephony session based on the second telephony identifier, B, and the called device 710 receives the telephony session establishment request of item S8*l* which comprises the first telephony identifier, A, as a calling party identifier. The called device 710 may, for example, display the first telephony identifier, A, and/or contact information associated with the first telephony identifier, A, to identify the calling party to the called party. Although, in this example, the calling party and the called party are both BYOD users, parts of the method may be performed where one of the calling party and the called party is a BYOD user and the other is an on-net user.

Figure 9:
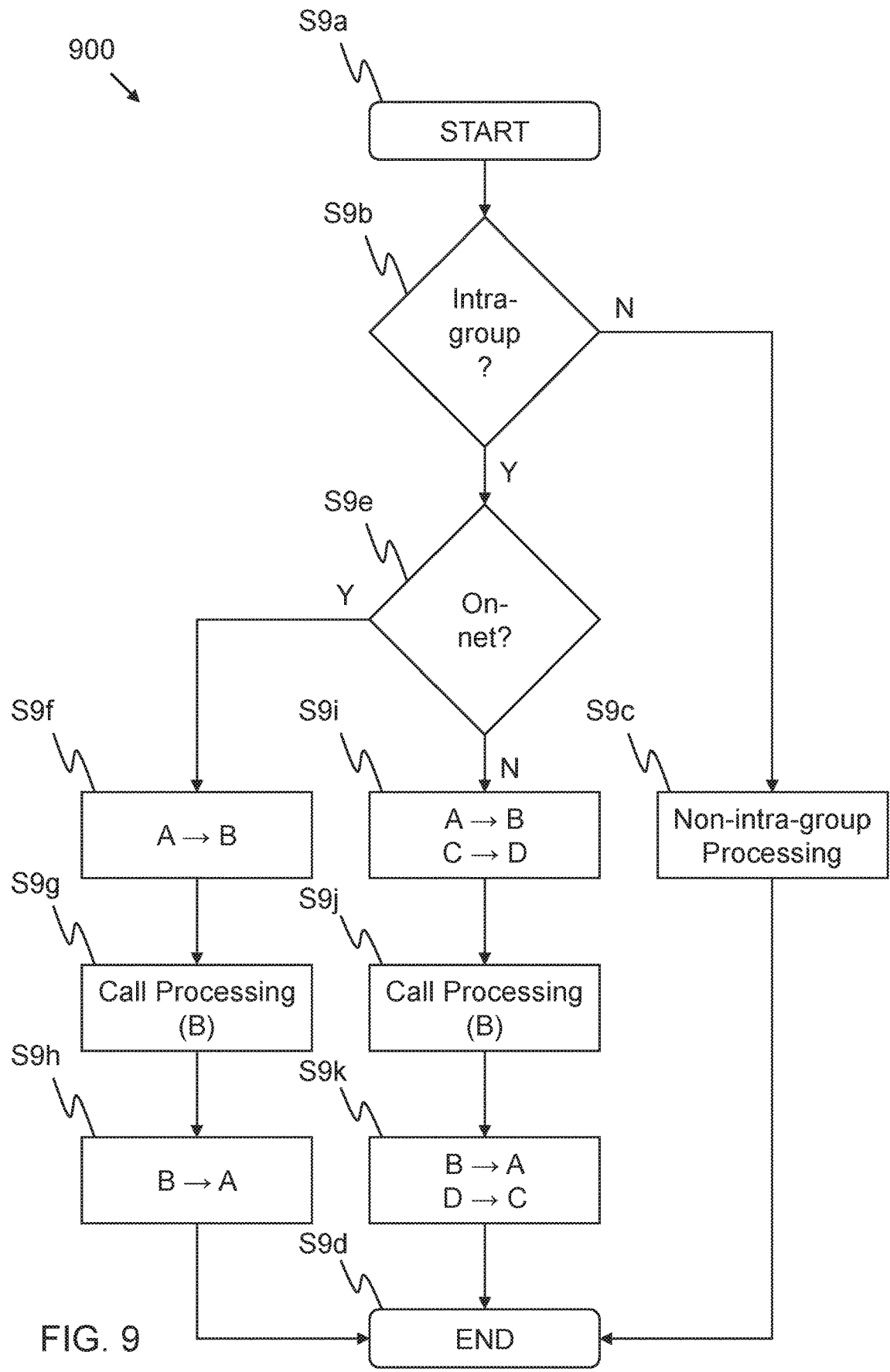
FIG. 9 shows a flow diagram depicting another example of a method in accordance with embodiments.

Referring to FIG. 9, there is depicted an example of a method 900. The method 900 is an example of a method of processing signalling relating to a telephony session. The method may be performed in the networks 300, 500, 700 described above, for example.

At item S9*a*, the method starts.

At item S9*b*, it is determined whether the telephony session is an intra-group telephony session.

If it is determined, at item S9*b*, that the telephony session is not an intra-group telephony session, then, at item S9*c*, signalling relating to the telephony session is processed in accordance with non-intra-group processing.

At item S9*d*, following the non-intra-group processing of item S9*c*, the method ends.

If it is determined, at item S9*b*, that the telephony session is an intra-group telephony session, then, at item S9*e*, it is determined whether or not the telephony session is an on-net telephony session.

If it is determined, at S9*e*, that the telephony session is an on-net telephony session, then, at item S9*f*, the first telephony identifier, A, is replaced with the second telephony identifier, B.

At item S9*g*, following the replacing of item S9*g*, call processing relating to the telephony session is performed based on the second telephony identifier, B.

At item S9*h*, following the call processing of item S9*g*, the second telephony identifier, B, is replaced with the first telephony identifier, A.

At item S9*d*, following the replacing of item S9*h*, the method ends.

If it is determined, at S9*e*, that the telephony session is not an on-net telephony session, then, at item S9*i*, the first telephony identifier, A, is replaced with the second telephony identifier, B. Also, at item S9*i*, the third telephony identifier, C, is replaced with the fourth telephony identifier, D.

At item S9*j*, following the replacing of item S9*i*, call processing relating to the telephony session is performed based on the second telephony identifier, B.

At item S9*k*, following the call processing of item S9*j*, the second telephony identifier, B, is replaced with the first telephony identifier, A. Also, at item S9*k*, the fourth telephony identifier, D, is replaced with the third telephony identifier, C.

At item S9*d*, following the replacing of item S9*k*, the method ends.

As such the mobile-originating AS instance is invoked, the mobile-originating AS instance checks if the call is destined for another group member. If the call is destined for another group member, the mobile-originating AS instance changes the call to appear as a call from the group line. In some examples, the mobile-originating AS instance adds a new SIP header to the call. The new SIP header records the original identity the call was from, namely the first telephony identifier, A. The new SIP header may be a custom SIP header. The call will then travel through the IMS core of the service provider network as a group call. This enables the call to be charged by the MMTel (and any other network entities in the core doing billing) to the business, or family group as opposed to the individual identity. The new SIP header could also be used by the service provider's MMTel or other network elements writing billing logs, to identify inter-group calls and bill them differently and/or to identify which member made the call. The original caller identifier may, for example, be written into a call detail record (CDR). When the mobile-terminating AS instance is invoked, the mobile-terminating AS instance changes the call to appear as a call from original caller. The mobile-terminating AS instance may check for the presence of the new SIP header, and if present, change the call's caller back to appear as the user in that header. In some examples, the AS is invoked on the mobile-terminating leg to the called device, as well as on the mobile-originating leg from the calling device. By default, this would not happen if the third telephony identifier, C, is owned off-net and as the IMS core in the service provider network would not normally have logical control data (for example iFC) invocations for the third telephony identifier, C. In accordance with this example, when the mobile-originating AS instance is invoked on mobile-originating calls, the mobile-originating AS instance checks if the target of the call is a BYOD member of the same group. If so, the originating AS instance redirects the call to be to the group member's BYOD identity (e.g. C@domain). Following this, the mobile-terminating AS instance will be invoked as a mobile-terminating AS on the BYOD identity of the caller. The mobile-terminating AS instance redirects the call back to the original identity.

The above embodiments are to be understood as illustrative examples. Further examples are envisaged.

Examples described above relate to processing signalling relating to a telephony session. The techniques described herein may be applied more generally in relation to any type of telecommunication, of which a telephony session is an example. Other examples include, but are not limited to, short message service (SMS) and multimedia messaging service (MMS) communications.

Examples described above relate to the second telephony identifier, B, being used a calling party identifier. In some examples, if a call is made from a non-group member to the second telephony identifier, B, the processing described above may not be performed. In particular, such a call would be made as a personal call from the non-group member to the second telephony identifier, B. In some examples, if a call is made from a group member to the second telephony identifier, B, the processing described above may be performed. In particular, call processing may be processed based on the second telephony identifier, B.

Examples described above relate to IMS networks. However, the techniques described herein may be applied in relation to other types of network. An example of another type of network is a next-generation network (NGN).

Examples described above relate to telephony session establishment requests being SIP INVITEs. Other types of telephony session establishment request may be used in other examples, for example where different network architectures and/or protocols are used.

In examples described above, various techniques are performed by one or more ASs. Such techniques may be performed by other types of network entities in other examples. The nature of such network entities may depend, for example, on the network architecture.

In examples described above, the calling and called devices are user devices. However, the calling and/or called devices may be devices other than user devices. For example, the called device could comprise network element providing an automated service associated with the group.

In examples described above, various telephony identifiers are retained within signalling for use by one or more downstream network entities. However, the one or more downstream network entities may have access to the various telephony identifiers in various different ways. For example, a network entity may be able to may a telephony identifier comprised in signalling to another telephony identifier via a database lookup. The database may be local to the network entity or may be shared with one or more other network entities. For example, with reference to FIGS. 6A and 6B, instead of the telephony session establishment requests of items S6d, S6e, S6g and S6h comprising the first telephony identifier, A, the replacing of item S6i may involve the AS 520 using the second telephony identifier, B, comprised in the telephony session establishment request of item S6h to look up the first telephony identifier, A. In some examples, and with reference again to FIGS. 6A and 6B, where the same AS instance 520 is invoked to perform the replacing of item S6c and the replacing of item S6i, the AS instance 520 could store the mapping of the first telephony identifier, A, to the second telephony identifier, B, in association with the replacing of item S6c and then use the stored mapping to map the second telephony identifier, B, to the first telephony identifier, A, at item S6i. Where multiple users may make calls in relation to the second telephony identifier, B, at the same time, additional data may be used to map second telephony identifier, B, to the first telephony identifier, A. An example of such additional data is a telephony session identifier comprised in the various telephony session establishment requests. The telephony session identifier identifies the specific telephony session to which the signalling relates. With reference again to FIGS. 6A and 6B, where different AS instances 520 are invoked to perform the replacing of item S6c and the replacing of item S6i, the first and second AS instances 520 may be able to communicate with each other so that, via such communications, the second AS instance 520 could determine the relationship between the second telephony identifier, B, and the first telephony identifier, A.

In examples described above, anonymous calling is not available for intra-group calls. In other words, in such examples, irrespective of settings on the calling device and/or AS(s), if the call is between group members, then wherever possible, the original identity of the caller is made available to the called party. In other examples, anonymous calling may be provided.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing signalling relating to a telephony session, the method comprising:
receiving, by an originating application server instance, a first telephony session establishment request relating to the telephony session, the first telephony session establishment request comprising a first telephony identifier as a calling party identifier wherein the first telephony identifier comprises a cell phone number;
replacing, by the originating application server instance, the first telephony identifier with a second telephony identifier, the second telephony identifier being different from the first telephony identifier, wherein the second telephony identifier identifies a group line;
enabling call processing relating to the telephony session to be performed based on the second telephony identifier;
replacing the second telephony identifier with a telephony identifier other than the second telephony identifier, wherein the telephony identifier other than the second telephony identifier comprises the first telephony identifier; and
transmitting a second telephony session establishment request relating to the telephony session, the second telephony session establishment request comprising the other telephony identifier.

2. The method of claim 1, wherein the first and second telephony identifiers comprise different types of telephony identifier.

3. The method of claim 1, wherein the method is performed:
in an IMS network; and/or
by one or more application server instances.

4. The method of claim 1, wherein the replacing of the second telephony identifier with the telephony identifier other than the second telephony identifier and the transmitting of the second telephony session establishment request are performed by a terminating application server instance.

5. The method of claim 1, wherein the first telephony session establishment request comprises a third telephony identifier as a called party identifier, the third telephony identifier being different from the first and second telephony identifiers.

6. The method of claim 5, wherein the second telephony session establishment request comprises the third telephony identifier as a called party identifier.

7. The method of claim 5, wherein the third telephony identifier comprises a cell phone number.

8. The method of claim 1, wherein the call processing relating to the telephony session comprises:
one or more network resource usage reports being generated based on the second telephony identifier; and/or
one or more originating call services being applied in relation to the telephony session based on the second telephony identifier.

9. The method of claim 1, wherein the first and second telephony session establishment requests do not comprise the second telephony identifier.

10. The method of claim 1, comprising:
transmitting, in response to the receiving of the first telephony session establishment request, a third telephony session establishment request relating to the telephony session, the third telephony session establishment request comprising the second telephony identifier as a calling party identifier; and receiving a fourth telephony session establishment request relating to the telephony session, the fourth telephony session establishment request comprising the second telephony identifier as a calling party identifier, wherein the transmitting of the second telephony session establishment request is in response to the receiving of the fourth telephony session establishment request.

11. The method of claim 10, comprising:

receiving a fifth telephony session establishment request relating to the telephony session, the fifth telephony session establishment request comprising the second telephony identifier as a calling party identifier; and transmitting a sixth telephony session establishment request relating to the telephony session, the sixth telephony session establishment request comprising the second telephony identifier as a calling party identifier, wherein the call processing relating to the telephony session is performed based on the second telephony identifier comprised in the fifth telephony session establishment request.

12. The method of claim 10, wherein the third, fourth, fifth and/or sixth telephony session establishment requests comprise a fourth telephony identifier as a called party identifier, the fourth telephony identifier being different from the first, second and third telephony identifiers.

13. The method of claim 12, wherein the method is performed in a service provider network associated with a given service provider and wherein the fourth telephony identifier is a local telephony identifier configured to be recognised in the service provider network and configured to not be recognised outside the service provider network.

14. The method of claim 12, wherein:

the fourth telephony identifier comprises a SIP URI; and/or the first and second telephony session establishment requests do not comprise the fourth telephony identifier.

15. The method of claim 10, wherein:

the third, fourth, fifth and/or sixth telephony session establishment requests comprise the third telephony identifier; and/or the third, fourth, fifth and/or sixth telephony session establishment requests comprise the first telephony identifier.

16. A network entity comprising one or more processors and one or more memories, the one or more memories comprising computer readable instructions, which when executed by the one or more processors cause the network entity to perform a method of processing signalling relating to a telephony session, the method comprising:

receiving, by an originating application server instance, a first telephony session establishment request relating to the telephony session, the first telephony session establishment request comprising a first telephony identifier as a calling party identifier, wherein the first telephony identifier comprises a cell phone number;

replacing, by the originating application server instance, the first telephony identifier with a second telephony identifier, the second telephony identifier being different from the first telephony identifier, wherein the second telephony identifier identifies a group line;

enabling call processing relating to the telephony session to be performed based on the second telephony identifier;

replacing the second telephony identifier with a telephony identifier other than the second telephony identifier, wherein the telephony identifier other than the second telephony identifier comprises the first telephony identifier; and transmitting a second telephony session establishment request relating to the telephony session, the second telephony session establishment request comprising the other telephony identifier.

17. A computer readable storage memory storing instructions that, when executed by one or more processors, cause the one or more processors to perform a method of processing signalling relating to a telephony session, the method comprising:

receiving, by an originating application server instance, a first telephony session establishment request relating to the telephony session, the first telephony session establishment request comprising a first telephony identifier as a calling party identifier wherein the first telephony identifier comprises a cell phone number;

replacing, by the originating application server instance, the first telephony identifier with a second telephony identifier, the second telephony identifier being different from the first telephony identifier, wherein the second telephony identifier identifies a group line;

enabling call processing relating to the telephony session to be performed based on the second telephony identifier;

replacing the second telephony identifier with a telephony identifier other than the second telephony identifier, wherein the telephony identifier other than the second telephony identifier comprises the first telephony identifier; and transmitting a second telephony session establishment request relating to the telephony session, the second telephony session establishment request comprising the other telephony identifier.

* * * * *